United States Patent [19]

Berry et al.

[11] Patent Number: 4,893,717
[45] Date of Patent: Jan. 16, 1990

[54] TRAILER HITCH FOR USE WITH A RAILROAD CAR

[75] Inventors: William K. Berry, Arlington, Tex.; Gary S. Kaleta, Warren, Oreg.

[73] Assignee: Burlington Northern Railroad, Fort Worth, Tex.

[21] Appl. No.: 303,469

[22] Filed: Jan. 27, 1989

[51] Int. Cl.⁴ .............................................. B61G 1/28
[52] U.S. Cl. ...................... 213/188; 213/86; 213/98; 213/192
[58] Field of Search ............ 213/77, 78, 86, 98, 213/188, 192, 205, 207, 201, 194, 195, 197, 198, 200

[56] References Cited

U.S. PATENT DOCUMENTS

| | | | |
|---|---|---|---|
| 416,367 | 12/1889 | Johnson | 213/188 |
| 421,711 | 2/1890 | Heymann et al. | 213/192 |
| 1,335,061 | 3/1920 | King | 213/98 |
| 2,477,476 | 7/1949 | Chalmers | 213/192 |
| 4,202,454 | 5/1980 | Browne et al. | 213/86 |
| 4,585,133 | 4/1986 | Cope | 213/188 |
| 4,669,391 | 6/1987 | Wicks et al. | 213/188 |

Primary Examiner—Robert J. Oberleitner
Assistant Examiner—Mark T. Le
Attorney, Agent, or Firm—Merchant, Gould, Smith, Edell, Welter & Schmidt

[57] ABSTRACT

A hitch (10) for releasably connecting a double stack trailer to a road railer car having a tongue (14) having an opening (15) includes a top wall (16), bottom wall (24) and first and second walls (28) and (30) cooperatively connected to form a housing (12) for receiving the tongue (14) of the road railer car. The housing (12) has an upper pin receiving opening (18) in the top wall (16), and a lower pin receiving opening (26) in the bottom wall (24). The upper and lower pin receiving openings (18) and (26) are in alignment. A shaft (42) is positioned below the bottom wall (24) and cooperatively connected between the first side wall (28) and the second side wall (30). A lever (22) has an upper arm (44) cooperatively connected to a lower arm (46) with a pivot point (48) positioned between the arms (44) and (46). The lever (22) has a portion of the upper arm (44) extending above the top wall (16), and the lower arm (46) is positioned below the bottom wall (24). A pin (50) is cooperatively connected to the lower arm (46). When in a disengaged position the pin (50) is in the lower pin receiving opening (26). When the upper arm (44) is depressed the pin (50) moves upward through the upper pin receiving opening (18) thereby securing the tongue (14) through its opening (15) which has been positioned in the housing (12).

17 Claims, 1 Drawing Sheet

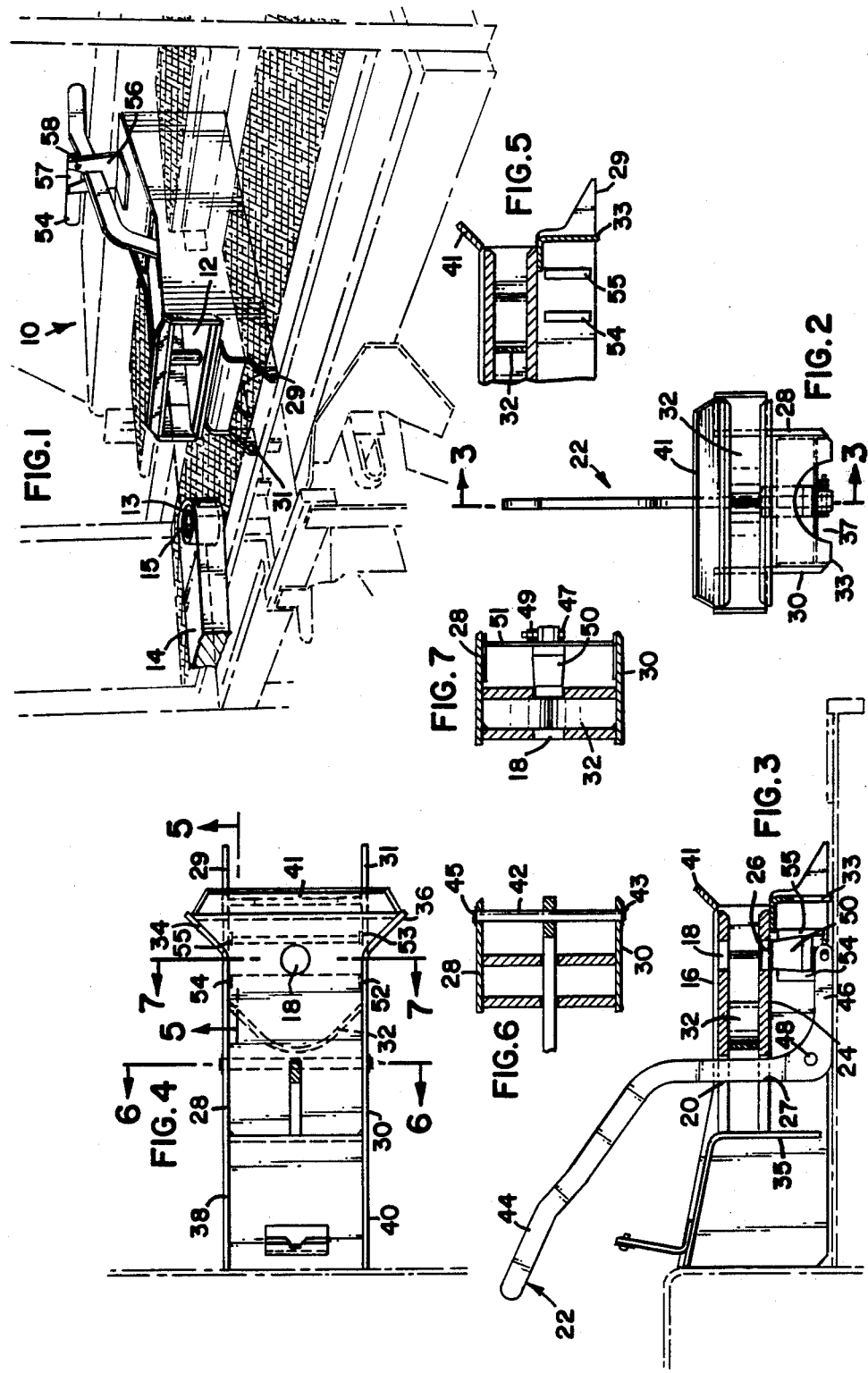

1

TRAILER HITCH FOR USE WITH A RAILROAD CAR

BACKGROUND OF THE INVENTION

1. Field of the Invention

This invention relates generally to trailer hitches and more particularly to trailer hitches that releasably connect railroad cars by means of a lever and locking pin.

2. Description of the Prior Art

It is desirable to use road railer equipment in the railroad industry. Traditionally, the road railer trailers were connected to standard railroad cars using adapter cars. The adapter car was connected to the road railer and then coupled to the standard hitch of the railroad cars. Therefore, it was necessary to haul the adapter cars, which do not transport goods, if the road railers were going to be used. As a result, non-productive units were hauled and productivity was decreased.

Prior art devices have utilized a van which sits on a conventional three piece truck. For example, the Railmaster hitch discloses such a hitch utilizing a top operated pin. A handle operated screw jack is used to couple a railroad car and the hitch. The present invention allows easier coupling through a bottom operated pin. Further, the present invention is designed to reduce loads into the road railer car. The present invention also allows for some decoupled rotation of the car and hitch. The Railmaster hitch does not allow for any decoupling.

The present invention allows coupling of road railer equipment to double stack car technology using a pin and lever mechanism. The hitch is adapted to both ends of the double stack car and is easily operated and utilized.

SUMMARY OF THE INVENTION

The present invention provides a hitch for releasably connecting a double stack trailer to a road railer car which has a tongue including an opening. The hitch includes a top wall, bottom wall and first and second side walls which are cooperatively connected to form a housing for receiving the tongue of the road railer car. The housing has an upper pin receiving opening in the top wall and a lower pin receiving opening in the bottom wall. The upper and lower pin receiving openings are in alignment.

A shaft is positioned below the bottom wall and cooperatively connected between the first side wall and the second side wall. A lever has an upper arm cooperatively connected to a lower arm and a pivot point positioned between the arms. A portion of the upper arm of the lever extends above the top wall and the lower arm is positioned below the bottom wall.

A pin is cooperatively connected to the lower arm. When the hitch is in a disengaged position the pin is in the lower pin receiving opening. When the upper arm is depressed, the pin moves upward through the upper pin receiving opening thereby securing the tongue through its opening which has been positioned in the housing.

BRIEF DESCRIPTION OF THE DRAWINGS

FIG. 1 is a perspective view of the hitch shown in an engaged, locked position.

FIG. 2 is a front view of the hitch of FIG. 1, shown in a disengaged, unlocked position.

FIG. 3 is a cross-sectional view taken generally along the line 3—3 in FIG. 2.

FIG. 4 is a top view of the hitch of FIG. 1 without the lever.

FIG. 5 is a cross-sectional view taken generally along the line 5—5 in FIG. 4.

FIG. 6 is a cross-sectional view taken generally along the line 6—6 in FIG. 4.

FIG. 7 is a cross-sectional view taken generally along the line 7—7 in FIG. 4.

DESCRIPTION OF THE PREFERRED EMBODIMENT

Referring to the drawings, wherein like numerals represent like parts throughout the several views, there is generally disclosed at 10, a trailer hitch. The hitch 10 is welded to the deck at the front or rear of a railroad car which is shown in phantom in FIG. 1. In the preferred embodiment, the hitch 10 is made of steel but it should be understood that any suitable material may be used.

The hitch 10 includes a housing 12 for receiving the tongue 14 of a trailer (not shown) with a tongue opening 15. The tongue opening 15 is tapered such that the diameter at the bottom is greater than that at the top. This tapering allows for easier coupling of the trailer and the hitch 10. The coupling tongue 14 includes a rotatable tapered bushing 13 which serves as a guide for tongue 14. The bushing 13 reduces the difficulty of lining up the trailer and the hitch 10. Also, the bushing 13 allows some rotation when coupled which dampens the oscillations between the double stack cars and road railer equipment. In addition, the design of the present invention allows the tongue 14 and hitch 10 to be placed at an elevation from the ground which aids in reducing load into the railcar as it reduces the eccentricity between load application and reaction points.

As shown in FIG. 3, the housing 12 has a top wall 16 which has an upper pin receiving opening 18. In addition, the housing 12 has an upper slot 20 which provides an opening for the lever 22 to travel in. The slot 20 is generallyrrectangular and sized and configured to receive the lever 22. The housing 12 has a bottom wall 24 which has a lower pin receiving opening 26 which is aligned with the upper pin receiving opening 18. While the upper and lower pin receiving openings 18 and 26 are shown to be generally circular it is understood that any suitable configuration will suffice as along as it provides a passage for the pin 50 to travel in. The bottom wall 24 also includes a bottom slot 27 for the lever 22 to travel in which is generally rectangular and sized and configured to receive the lever 22. The bottom slot 27 is aligned with the upper slot 20.

The positioning of the walls in housing 12 is shown in FIGS. 2, 3 and 4. First side wall 28 is positioned generally perpendicular to the top wall 16 and bottom wall 24 and extends below the bottom wall 24. Second side wall 30 is positioned generally perpendicular to the top wall 16 and bottom wall 24 and extends below the bottom wall 24 thereby completing the housing 12. First and second side walls 28 and 30 and top and bottom walls 16 and 24 are connected by welding but may be connected by any suitable connecting means. The first and second side walls 28 and 30 include first and second extensions 29 and 31 as shown in FIGS. 1 and 4. First and second extensions 29 and 31 extend below bottom wall 24 and beyond the opening of housing 12 to provide support for the housing 12. Both first extension 29 and second extension 31 are tapered to prevent fatigue failure. Front support 33 and rear support 35, shown in FIG. 3, provide additional support for the hitch 10. Rear support 35 is generally a wide V-shaped plate sized and configured to support the structure of hitch 10. Front support 33 is a generally L-shaped plate of a width necessary to fit within side walls 28 and 30. As shown in FIG. 2, front support 33 has an opening 37 which provides access to the pin 50. While the opening 37 is shown to be generally semi-circular it is understood that any suitable configuration will suffice as long as it provides access to pin 50. Both front support 33 and rear support 35 are welded in place. A back wall 32 is positioned and welded between the first side wall 2, second side wall 30, top wall 16 and bottom wall 24 such that a barrier is formed to provide a stop which aids in the positioning of the tongue 14. The back wall 32 is of a generally semi-circular shape so as to form around the tongue 14.

The first side wall 28 includes a forward portion 34 and backward portion 38. The second side wall 30 includes a forward portion 36 and a backward portion 40. The first and second side walls 28 and 30 flare outwardly at the opening of the housing 12 such that the width at the forward portions 34 and 36 of the first and second side walls 28 and 30 is greater than at the backward portions 38 and 40. The flared portion, as shown in FIGS. 3 and 4, is positioned between the top wall 16 and bottom wall 24. This greater width at the opening provides a guide for the tongue 14. In addition, deflector plate 41 is secured to top wall 16 and provides an upper guide for the tongue 14. In the preferred embodiment, the deflector plate 41 is welded to top wall 16.

The lever 22 has an upper arm 44 cooperatively connected to lower arm 46 with pivot point 48 positioned between them. The upper arm 44 and lower arm 46 are formed as a single connected piece in the preferred embodiment. A portion of the upper arm 44 extends above the top wall 16. The lower arm 46 is positioned below the bottom wall 24.

The lower arm 46 and the pin 50 are cooperatively connected to the pin carrier 51. In the preferred embodiment, the pin 50, the pin carrier 51 and the lower arm 46 of lever 22 are connected by bolt 47 and nut 49 as shown in FIGS. 3 and 7 although any suitable fastening means will suffice. While it is understood that the pin 50 may have any number of suitable configurations in the preferred embodiment the pin is generally frusta-conical in shape and perpendicular to the ground. The pin carrier 51, as shown in FIG. 7 is a flanged plate generally parallel to the ground. Pin guides 52, 53, 54, 55, shown by dashed lines in FIG. 4, are cooperatively connected to the inside of side walls 28 and 30 where two guides are attached to each side wall. The guides 52, 53, 54, 55 are placed in predetermined positions to accommodate the size and configuration of the pin carrier 51 such that the pin guides form two slots for the pin carrier 51 to move in. Pin guides 54 and 55 are shown welded to side walls 28 in FIGS. 3 and 4 although it should be understood that any other suitable connecting means including but not limited to a nut and bolt arrangement or a rivet will suffice.

A shaft 42, as shown in FIG. 6, extends from the first side wall 28 to the second side wall 30 and is fastened by a bolt 43 and a nut 45. The pin 50 is flush with the top of the lower pin receiving opening 26 when the hitch is in the disengaged position. When the upper arm 44 of lever 22 is depressed, the lever 22 pivots at pivot point 48 about shaft 42, travels in slots 20 and 27 and the pin 50 moves upward by means of the pin carrier 51 through the lower pin receiving opening 26 through the tongue opening 15 into the upper pin receiving opening 18 thereby securing the tongue 14.

A latch bracket 56 is cooperatively connected to the housing 12 where the latch bracket 56 has an opening 57 of predetermined form to receive the lever 22 in its depressed position. In the preferred embodiment, the opening 57 is generally Y-shaped to serve as a guide for lever 22. A latch 54 is cooperatively connected to the latch bracket 56 which secures lever 22 in a locked depressed position thereby insuring coupling of the stack car and road railer car. The latch 54 and latch bracket 56 are connected by rivet 58 as shown in FIG. 3 but may be connected by other suitable fastening means.

Other modifications of the invention will be apparent to those skilled in the art in light of the foregoing description. This description is intended to provide specific examples of individual embodiments which clearly disclose the present invention. Accordingly, the inventions are not limited to these embodiments or the use of elements having specific configurations and shapes as presented herein. All alternative modifications and variations of the present invention which follow in the spirit and broad scope of the appended claims are included.

What is claimed is:

1. A hitch for releasably connecting a double stack trailer to a road railer car having a tongue having an opening, comprising:
   (a) a top wall, bottom wall and first and second side walls cooperatively connected to form a housing for receiving the tongue of the road railer car, the housing having an upper pin receiving opening in the top wall, and a lower pin receiving opening in the bottom wall, the pin receiving openings in alignment, the side walls extending below the bottom wall;
   (b) a shaft positioned below the bottom wall and cooperatively connected between the first side wall and the second side wall;
   (c) a lever having an upper arm cooperatively connected to a lower arm and a pivot point positioned between the arms, the lever having a portion of the upper arm extending above the top wall, and the lower arm positioned below the bottom wall; and
   (d) a pin cooperatively connected to the lower arm, the pin having two positions, engaged and disengaged, whereby when in the disengaged position the pin is in the lower pin receiving opening and when the upper arm is depressed the pin moves upward through the upper pin receiving opening thereby securing the tongue through its opening which has been positioned in the housing.

2. The hitch of claim 1 wherein the side walls have a forward portion and a backward portion wherein the forward portion generally flares outwardly so as to provide a guide for the tongue.

3. The hitch of claim 2 wherein the forward portion is positioned between the top wall and the bottom wall.

4. The hitch of claim 1 wherein the upper pin receiving opening and lower pin receiving opening are generally circular.

5. The hitch of claim 1 wherein the pin is generally frusta-conical in shape.

6. The hitch of claim 1 wherein the pin is cooperatively connected to a pin carrier.

7. The hitch of claim 1 further comprising four pin guides cooperatively connected to the side walls thereby providing a guide for the pin carrier.

8. The hitch of claim 1 further comprising a back wall cooperatively connected to the housing thereby providing an aid for positioning the tongue.

9. The hitch of claim 7 wherein the back wall is positioned between the top and bottom walls.

10. The hitch of claim 8 wherein the back wall is generally semi-circular.

11. The hitch of claim 1 wherein the top wall has a first slot which provides an area in which the lever travels.

12. The hitch of claim 1 wherein the bottom wall has a second slot which provides an area in which the lever travels.

13. The hitch of claim 11 wherein the first slot is sized and configured to correspond with the lever.

14. The hitch of claim 12 wherein the second slot is sized and configured to correspond with the lever.

15. The hitch of claim 1 further comprising a bracket cooperatively connected to the housing, the bracket having an opening sized and configured to receive the lever.

16. The hitch of claim 1 wherein the bracket includes a latch means for securing the lever into the bracket.

17. A hitch for releasably connecting a double stack trailer to a road railer car having a tongue having an opening, comprising:
 (a) a top wall, bottom wall, back wall, and first and second side walls cooperatively connected to form a housing for receiving the tongue of the road railer car, the housing having a generally circular upper pin receiving opening in the top wall, and a generally circular lower pin receiving opening in the bottom wall, the pin receiving openings in alignment, the side walls extending below the bottom wall and having a forward portion generally flared outward so as to provide a guider for the tongue and a backward portion, wherein the forward portion is positioned between the top wall and the bottom wall, the back wall positioned between the top and bottom walls;
 (b) a shaft positioned below the bottom wall and cooperatively connected between the first side wall and the second side wall;
 (c) a lever having an upper arm cooperatively connected to a lower arm and a pivot point positioned between the arms, the lever having a portion of the upper arm extending above the top wall, and the lower arm positioned below the bottom wall, the top wall having a first slot sized and configured to correspond to the lever which provides an area in which the lever travels, the bottom wall having a second slot sized and configured to correspond to the lever which provides an area in which the lever travels;
 (d) a generally frusta-conical shaped pin cooperatively connected to the lower arm, the pin having engaged and disengaged positions, whereby when in the disengaged position the pin is in the lower pin receiving opening and in the engaged position when the upper arm is depressed and the pin moves upward through the upper pin receiving opening thereby securing the tongue through its opening which has been positioned in the housing;
 (e) a pin carrier cooperatively connected to the pin;
 (f) four pin guides cooperatively connected to the side walls thereby providing a guide for the pin carrier;
 (g) a bracket cooperatively connected to the housing, the bracket having an opening sized and configured to receive the lever, and a latch means for securing the lever into the bracket.

* * * * *

UNITED STATES PATENT AND TRADEMARK OFFICE
CERTIFICATE OF CORRECTION

PATENT NO. : 4,893,717

DATED : January 16, 1990

INVENTOR(S) : William K. Berry and Gary S. Kaleta

It is certified that error appears in the above-identified patent and that said Letters Patent is hereby corrected as shown below:

In column 2, line 42, please delete "generallyrrectangular" and substitute --generally rectangular--.

In column 6, line 1, please delete "guider" and substitute --guide--.

Signed and Sealed this

Sixteenth Day of July, 1991

Attest:

HARRY F. MANBECK, JR.

Attesting Officer

Commissioner of Patents and Trademarks